United States Patent [19]

Kunz

[11] Patent Number: 4,809,555
[45] Date of Patent: Mar. 7, 1989

[54] PRESSURE SENSOR

[76] Inventor: Manfred Kunz, Am Wiesenhang 4, D-8121 Aidenried/Ammersee, Fed. Rep. of Germany

[21] Appl. No.: 903,461

[22] Filed: Sep. 3, 1986

[30] Foreign Application Priority Data

Nov. 9, 1985 [EP] European Pat. Off. ............ 85111457

[51] Int. Cl.$^4$ ............................................. G01L 9/04
[52] U.S. Cl. .................... 73/727; 73/DIG. 4; 73/721; 338/4; 338/42
[58] Field of Search ........... 73/706, 721, 727, DIG. 4, 73/708, 715; 338/4, 42, 46

[56] References Cited

U.S. PATENT DOCUMENTS

| | | | |
|---|---|---|---|
| 3,817,107 | 6/1974 | Shimada et al. | 73/727 |
| 4,129,042 | 12/1978 | Rosvold | 73/727 |
| 4,226,125 | 10/1980 | Waugh | 73/721 |
| 4,303,903 | 12/1981 | Matsuoka et al. | 338/4 |
| 4,333,349 | 6/1982 | Mallon et al. | 338/4 |
| 4,411,158 | 10/1983 | Schaff, Jr. | 73/727 |
| 4,656,454 | 4/1987 | Rosenberger | 338/42 |
| 4,665,754 | 5/1987 | Glenn et al. | 73/727 |
| 4,675,643 | 6/1987 | Tanner et al. | 338/4 |
| 4,680,569 | 7/1987 | Yamaki et al. | 338/4 |
| 4,726,233 | 2/1988 | Eckardt et al. | 73/727 |

FOREIGN PATENT DOCUMENTS 3344799 6/1985 Fed. Rep. of Germany ........ 73/721

OTHER PUBLICATIONS

KMK Sensortechnik brochure.

Primary Examiner—Joseph A. Orsino
Assistant Examiner—Brent A. Swarthout
Attorney, Agent, or Firm—Max Fogiel

[57] ABSTRACT

A pressure sensor has a metal housing. The housing has a closed-off and fluid-filled pressure space. A diaphragm partitions the pressure space off from the environment and transmits pressures derived therefrom to the fluid. A pressure-sensitive chip of semiconducting material is exposed to the pressure of the fluid and has a piezoresistant and anisotropic effect. Connectors, metal rods for instance, extend pressure-tight and electrically insulated from the metal housing into the pressure space. The connectors can be connected to an electric processing circuit. The pressure-sensitive chip is connected by bonds. To provide a pressure sensor that will be cheaper to manufacture, less sensitive to malfunction, and more precise, the pressure sensor is provided with a base plate of aluminum nitride. At least some areas of its surface are metallized. The pressure-sensitive chip is soldered to the base plate within a metallized area.

6 Claims, 3 Drawing Sheets

PRESSURE SENSOR

BACKGROUND OF THE INVENTION

The present invention relates to a pressure sensor with a metal housing, with a closed-off and fluid-filled pressure space, with a diaphragm that partitions the pressure space off from the environment and transmit pressures derived therefrom to the fluid, with a pressure-sensitive chip of semiconducting material that is exposed to the pressure of the fluid and has a piezoresistant and anisotropic effect, and with connectors, metal rods for instance, that extend pressure-tight and electrically insulated from the metal housing into the pressure space and that can be connected to an electric processing circuit, whereby the pressure-sensitive chip is connected by bonds.

Pressure sensors of this type are known, from the KMK brochure, Sensoren und Messwert-Verarbeitungssysteme für die Industrie for example. They are employed in pressure transducers. They have a special-steel housing in the form of a bolt with an outside thread and a hexagonal head. The partitioning diaphragm is mounted on the front. The pressure-sensitive chip is mounted on a base and connected to a processing circuit at the rear (outer end) of the sensor, and the connectors are insulated with glass.

There are disadvantages to pressure sensors of this type. It takes a lot of fluid, comparatively, to fill the pressure space. The glass insulation is expensive and leads to a high rate of rejection for the housings, which are made out of costly special steel. Even more expensive is the electric processing circuit for the transducer that accommodates the sensor, and it is impossible to test how well the transducers function until they are finished. Since the chip is mounted on a base, powerful impacts can snap it off because the shock wave can lead to excess pressure at the chip and to release of the pressure above it. If only a little fluid is employed in the pressure space in an attempt to improve the rating, the diaphragm can actually impact the chip when pressures are high enough. A highly significant drawback however is that the pressure within the pressure space increases along with temperature and acts on the chip, resulting in undesirable temperature-dependent errors in the instrumentation results.

SUMMARY OF THE INVENTION

The object of the present invention is to provide a pressure sensor of the aforesaid generic type that will be cheaper to manufacture, less sensitive to malfunction, and more precise.

This object is attained in accordance with the invention in a pressure sensor of the type initially described wherein the pressure sensor is provided with a base plate of aluminum nitride with at least some areas of its surface being metallized and wherein the pressure-sensitive chip is soldered to the base plate within a metallized area.

Thus, the base plate serves at least to some extent in accordance with the invention to occupy the pressure space, which can be filled up with less fluid than at the state of the art. Furthermore, since the space is not as full, temperature will have less of an effect on the results. The effects of temperature are decreased even more because the base plate is made out of aluminum nitride (AlN) and has practically the same coefficient of thermal expansion as the pressure-sensitive chip, so that no thermal stresses can occur between the chip and the base plate and affect the accuracy of the sensor. The chip can accordingly be connected over almost its total area with the base plate. This will also prevent dynamic pressures from snapping the chip off of the plate. Furthermore, the base plate can be manufactured with the pressure-sensitive chip already soldered onto it in the form of a premounted and equilibrated subassembly and then inserted into the pressure-transducer housing, subsequent to which it will only be necessary to solder the connectors that extend into the pressure space to tracks provided on the base plate and equipped with bores for the connectors. This will not only mechanically secure the base plate but also establish the electric connection for the chip. The complicated and fragile subsequent bonding that is conventional at the state of the art is unnecessary.

Although all of these advantages are in particular characteristic of a pressure sensor in accordance with the invention that operates at high pressures, they are also present in a device that operates in the low-pressure range.

When operating in the low-pressure range, the front of the chip is subjected through the fluid to the pressure that is to be measured and the rear of the chip with a reference pressure supplied from a tube. The lower surface of the base plate, the surface that faces away from the chip, is accordingly metallized and an access opening extends from the bottom to the top of the plate within the metallized area, with the tube being soldered to that area pressure-tight. The pressure-sensitive chip is also of course enclosed all around, meaning that it is securely soldered pressure-tight to the base plate.

The result is a simple and inexpensively manufactured pressure sensor that is both more reliable and more precise.

There exist several different embodiments of the pressure sensor in accordance with the invention.

One embodiment has a pressure-sensitive chip that is square as viewed from above, whereby the chip has four metallized areas of the same size, each area is rectangular as viewed from above, and all four areas are equally distributed around a center in the shape of a cross. The long sides of each rectangular metallized area of the base plate can point toward the center. The four rectangular metallized areas can extend over an imaginary square that is larger than the area of the square pressure-sensitive chip. The long and short sides of the rectangular metallized areas can extend along the mechanically inactive directions of the soldered-on anisotropic pressure-sensitive chip. Thus, mechanical stresses in the base plate will not be transmitted to the chip. Soldering the chip directly onto the base plate reduces the total height of the device, necessitating less fluid, so that dynamic pressures as well can be satisfactorily measured.

The four metallized areas can touch.

The base plate can have tracks electrically connecting it to the pressure-sensitive chip and with conducting rods and if necessary balancing resistors and/or a temperature-compensation circuit.

The base plate can have bores arranged in a circle to accommodate the connectors, which are arranged in a circle and extend beyond the bores when inserted. The bores can be in the vicinity of the tracks. The bores can be completely surrounded by the tracks.

The base plate can be installed in the pressure sensor in the form of a finished, tested, and equilibrated subassembly with the pressure-sensitive chip electrically connected through to a processing circuit and with balancing resistors and/or a temperature-compensation circuit if necessary. The finished subassembly is positioned with the bores against the connectors and the projecting sections soldered to the tracks. The base plate can have a metal manifold to make automatic assembly possible. The balancing resistors and temperature-compensation circuit will make it possible to test the chip and determine and vary its characteristics before final assembly. Since only the plate and the chip will be subject to rejection, costs will be kept down.

The base plate can be circular and have a flange around it that extends above the pressure-sensitive chip. Thus, even very powerful pressures that would tend to distort the diaphragm cannot damage the chip because the diaphragm will come to rest against the flange.

The bottom of the base plate, the surface that faces away from the pressure-sensitive chip, can have a metallized area and an access opening can extend from the bottom to the top of the plate within that area. A tube that can be subjected to a reference pressure can be soldered gas-tight to the metallized area on the bottom of the base plate and surrounding the access opening. The base plate can be soldered gas-tight and with its metallized area on the bottom to the housing in such a way as to surround the access opening, which can communicate with an access bore in the housing.

The access opening can terminate below the pressure-sensitive chip on the top of the base plate, with the chip soldered to the top of the plate all the way around.

Space-occupying structures with a coefficient of thermal expansion less than or equal to zero can be mounted on the base plate. The structures provide temperature compensation, greatly increasing precision.

The base plate can be positioned in the pressure sensor parallel to and in the vicinity of the partitioning diaphragm. The partitioning diaphragm can be made out of plastic. The plastic can be polytetrafluoroethylene. The plastic diaphragm can be less than 100 $\mu$m (micrometers) thick.

Some preferred embodiments of the invention will now be described with reference to the attached drawings, wherein

DETAILED DESCRIPTION OF THE PREFERRED EMBODIMENTS

Figure 1:
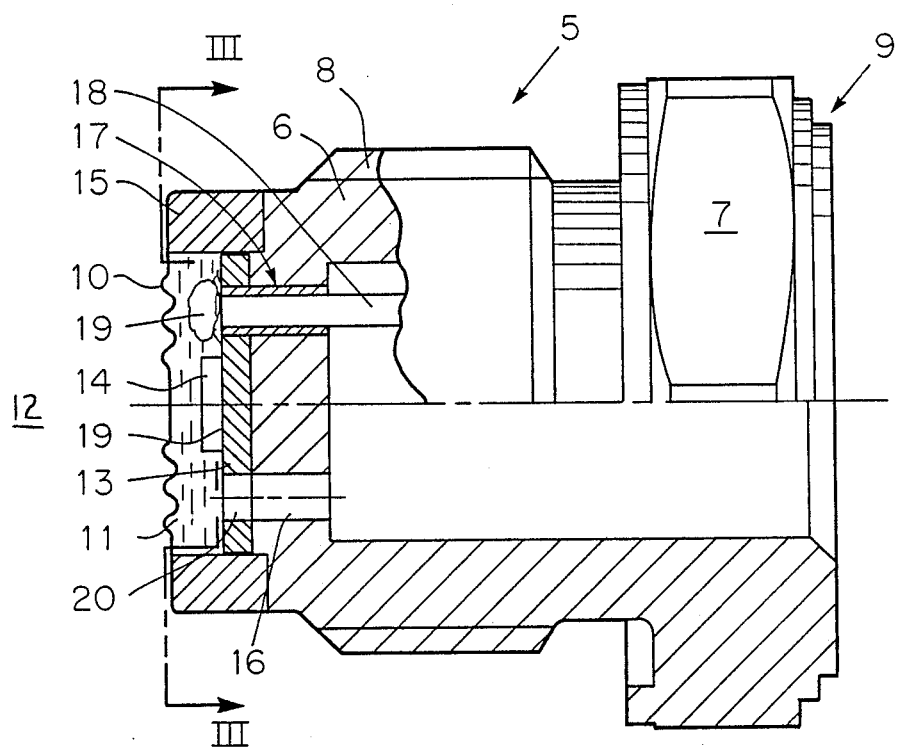
FIG. 1 is a longitudinal partial section through a pressure sensor.

A pressure sensor 5, intended for use at high pressures, has a metal, preferably special-steel, housing 6 and is provided at one end, like a screw-in bolt, with an outside hexagon 7 and an outside thread 8. An encapsulated electric processing circuit, not illustrated, can be directly connected to the area 9 opposite outside thread 8 in relation to outside hexagon 7 to create a finished pressure transducer.

Pressure sensor 5 has at the front a partitioning diaphragm 10 demarcating a pressure space 11 that is closed off from the outside 12 and filled with fluid. The base of pressure space 11 opposite diaphragm 10 consists of a base plate 13. A pressure-sensitive chip 14 of piezoelectric and anisotropic semiconductor material is mounted on base plate 13. Pressure space 11 can be demarcated laterally by means of a ring 15 secured to housing 6 by welding for example.

Base plate 13 and the adjacent area of housing 6 are provided with perforations 16. Conducting rods 18 extend, pressure-tight and electrically insulated from metal housing 6 by means of glass sleeves 17, through perforations 16 and lead to an electric processing circuit, not illustrated. Base plate 13 and pressure-sensitive chip 14 are mechanically and electrically connected to conducting rods 18 by the very simple means of solder 19.

Figure 2:
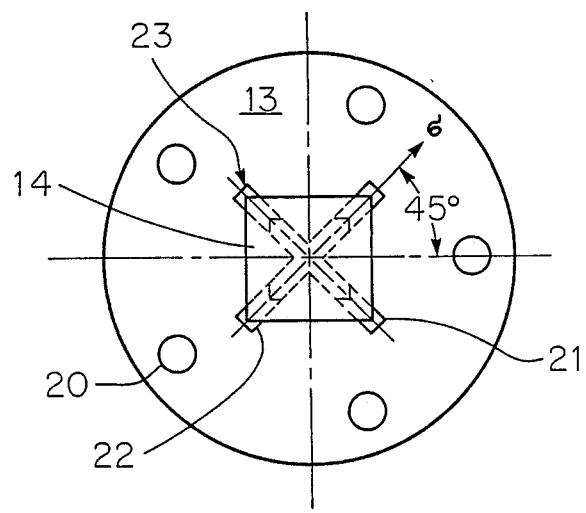
FIG. 2 is a top view of a base plate with the pressure sensor illustrated in FIG. 1.

FIG. 2 is a schematic top view of base plate 13, which is preferably made out of aluminum nitride (AlN), a substance that has approximately the same coefficient of thermal expansion as pressure-sensitive chip 14, preventing any measurement errors as the result of the absence of tension between the two components. Base plate 13 has a ring of bores 20 around pressure-sensitive chip 14 that communicate with the perforations 16 in pressure sensor 5 (FIG. 1). The surface of base plate 13 is provided with metallized areas 21. Pressure-sensitive chip 14, which is square as viewed from above, is soldered to metallized areas 21.

There is a total of four metallized areas 21, all equal in size. Each area is rectangular as viewed from above. The four areas are uniformly distributed in the shape of a cross around a central point. The long sides 22 of each rectangular metallized area 21 point toward this center. The areas extend over an imaginary square that is larger than the area of square pressure-sensitive chip 14. The long 22 and short 23 sides of all four areas extend along the mechanically inactive directions of the solder-on anisotropic pressure-sensitive chip 14. The four metallized areas 21 touch one another and merge into each other at the center as will be evident from the broken lines in FIG. 2.

Figure 3:
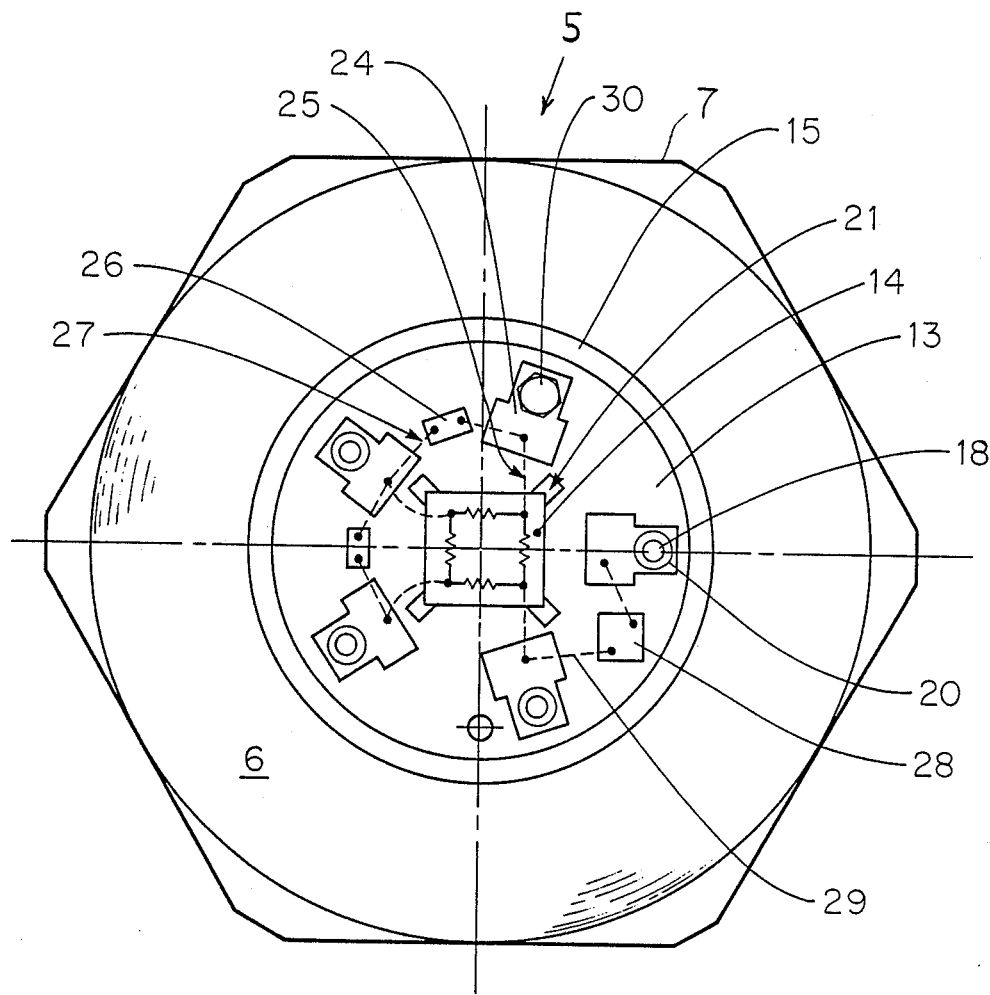
FIG. 3 is a section along the line III—III in FIG. 1.

FIG. 3 illustrates how base plate 13 is partly soldered to conducting rods 18 and how the electrically connected pressure-sensitive chip 14 is soldered to metallized areas 21. The top of base plate 13 is provided with tracks 24. The bores 20 on base plate 13 terminate in tracks 24. Pressure-sensitive chip 14 is bonded to tracks 24 with schematically illustrated bonds 25, balancing resistors 26 with schematically illustrated bonds 27 and, if necessary, a temperature-compensation circuit 28 with schematically illustrated bonds 29. Base plate 13, prefabricated or preassembled in this way and equilibrated, is then inserted into the pressure space 11 in pressure sensor 5, with conducting rods 18 projecting beyond the surface of the plate. The plate is then connected both mechanically and electrically by means of a soldered connection 30.

Figure 4:
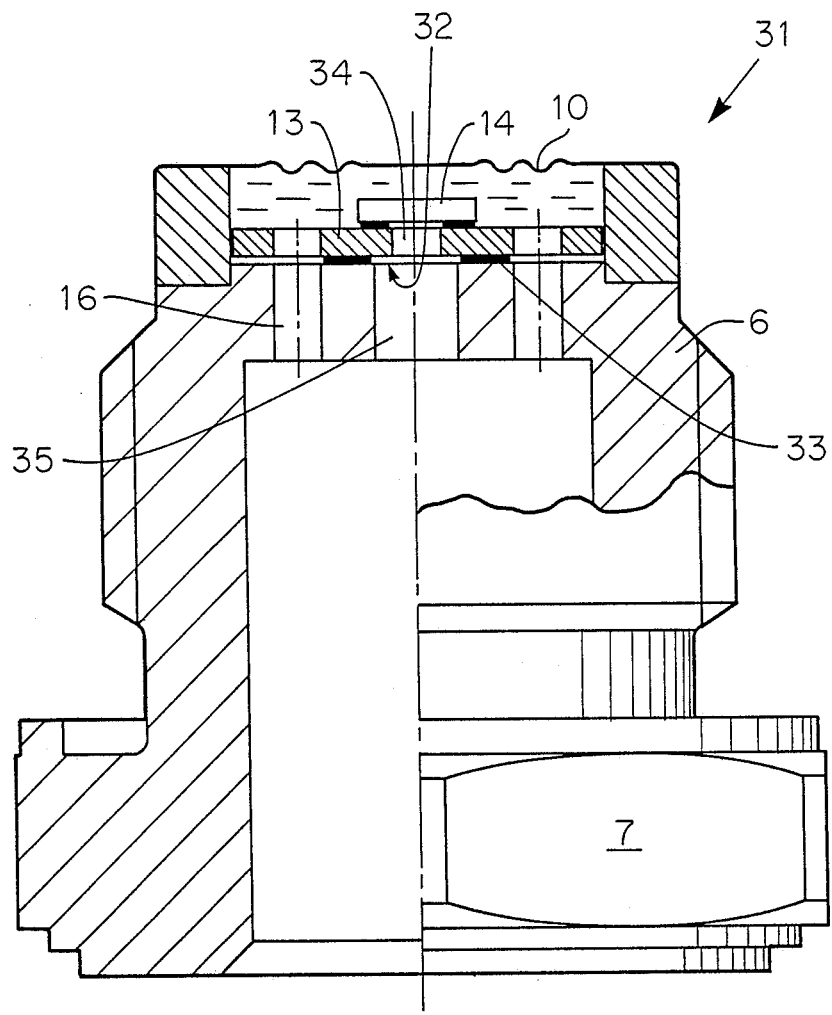
FIG. 4 is an illustration like that in FIG. 1 of another embodiment of a pressure sensor intended for low pressures.

FIG. 4 illustrates another embodiment of a pressure sensor 31, which is intended for use with low pressures. Both embodiments are extensively similar and similar parts are accordingly mostly labeled herein with the same reference numbers.

The essential difference between this embodiment and the one illustrated in FIG. 1 is that base plate 13 also has metallized areas 33 on the bottom, the surface that faces away from the top and from pressure-sensitive chip 14. The same area contains an access opening 34 that extends from the top to bottom 32 and communicates with an access bore 35 in the housing 6 of pressure sensor 31. The metallized areas 33 on the bottom are connected either to a tube, not illustrated, or to housing 6. In either case they are soldered pressure-tight around access bore 35 and access opening 34, so that a reference pressure can be applied to the bottom of pressure-sensitive chip 14 through the bore and the opening.

The invention has been described herein with reference to exemplary embodiments. It will be understood, however, that it is receptable of various modifications, which will offer themselves to those skilled in the art and which are intended to be encompassed within the protection sought for the invention as set forth in the appended claims.

I claim:

1. A pressure sensor comprising: a metal housing with means defining a closed-off pressure space filled with fluid; a diaphragm for separating said pressure space from the environment and transmitting pressures derived from the environment to said fluid; a pressure-sensitive chip of semiconducting material exposed to pressures of said fluid and having piezoresistive and anisotropic characteristics; metal rod connectors extending into said pressure space, said connectors being sealed pressure-tight with respect to said metal housing and being electrically insulated from said metal housing; said metal rod connectors being connectable to an electric processing circuit; said chip being connected by bonds to said metal rod connectors; a base plate of aluminum nitride forming a side of said pressure space opposite said diaphragm and having a surface with at least some metallized areas; said chip being soldered to said base plate within a metallized area; said chip having a square shape when viewing toward said base plate, said plate having four metallized areas of equal size and each area being rectangular-shaped when viewing towards said base plate, all said four areas being equally distributed around a center and forming the shape of a cross; said four rectangular metallized areas extending over an imaginary square that is larger than the area of said square-shaped chips said rectangular metallized areas having long and short sides extending along predetermined directions of said chip; said four metallized areas being in contact with each other; said base plate having bonds electrically connecting said base plate to said chip, said base plate having also conducting rods, balancing resistors and temperature-compensation circuit means, and means for electrically interconnecting said rods, resistors and circuit means; said base plate having bores arranged in a circle for receiving said conducting rods, said conducting rods extending beyond said bores when inserted into said bores; said bores being located adjacent said bonds, said bores being completely surrounded by said bonds; said base plate being installed in said pressure-sensor in the form of a finished, and tested subassembly, said pressure-sensitive chip being electrically connected to said processing circuit through balancing resistors and temperature-compensation circuit means; said subassembly being positioned with said bores against said conducting rods, sections of said subassembly being soldered to said bonds; said base plate having a metal manifold for soldering said chip thereto; said base plate having a top surface carrying said chip and a bottom surface lying opposite said top surface, said bottom surface having a metallized area and an access opening extending from said bottom surface to said top surface of said plate within said metallized area; said base plate with its metallized area on said bottom surface being soldered gas-tight to said housing, said metallized area surrounding said access opening, said access opening communicating with an access bore in said housing; said access opening terminating at said chip soldered on said top surface of said base plate, said chip being soldered to said top surface about the entire perimeter of said chip; elements mounted on said base plate and having a coefficient of thermal expansion equal to zero or less than zero; said base plate being positioned in said pressure sensor adjacent said diaphragm and parallel to said diaphragm, said aluminum nitride having an expansion coefficient corresponding substantially to the expansion coefficient of said chip for reducing mechanical stresses on said chip.

2. A pressure sensor as defined in claim 1, wherein said base plate has a circular shape.

3. A pressure sensor as defined in claim 1, including a tube soldered gas-tight to said metallized area on said bottom surface of said base plate and surrounding said access opening, said tube being subjected to a reference pressure.

4. A pressure sensor as defined in claim 1, wherein said diaphragm is comprised of plastic.

5. A pressure sensor as defined in claim 4, wherein said plastic comprises polytetrafluoroethylene.

6. A pressure sensor as defined in claim 4, wherein said plastic diaphragm has a thickness less than 100 $\mu$m.

* * * * *